Figure 1:
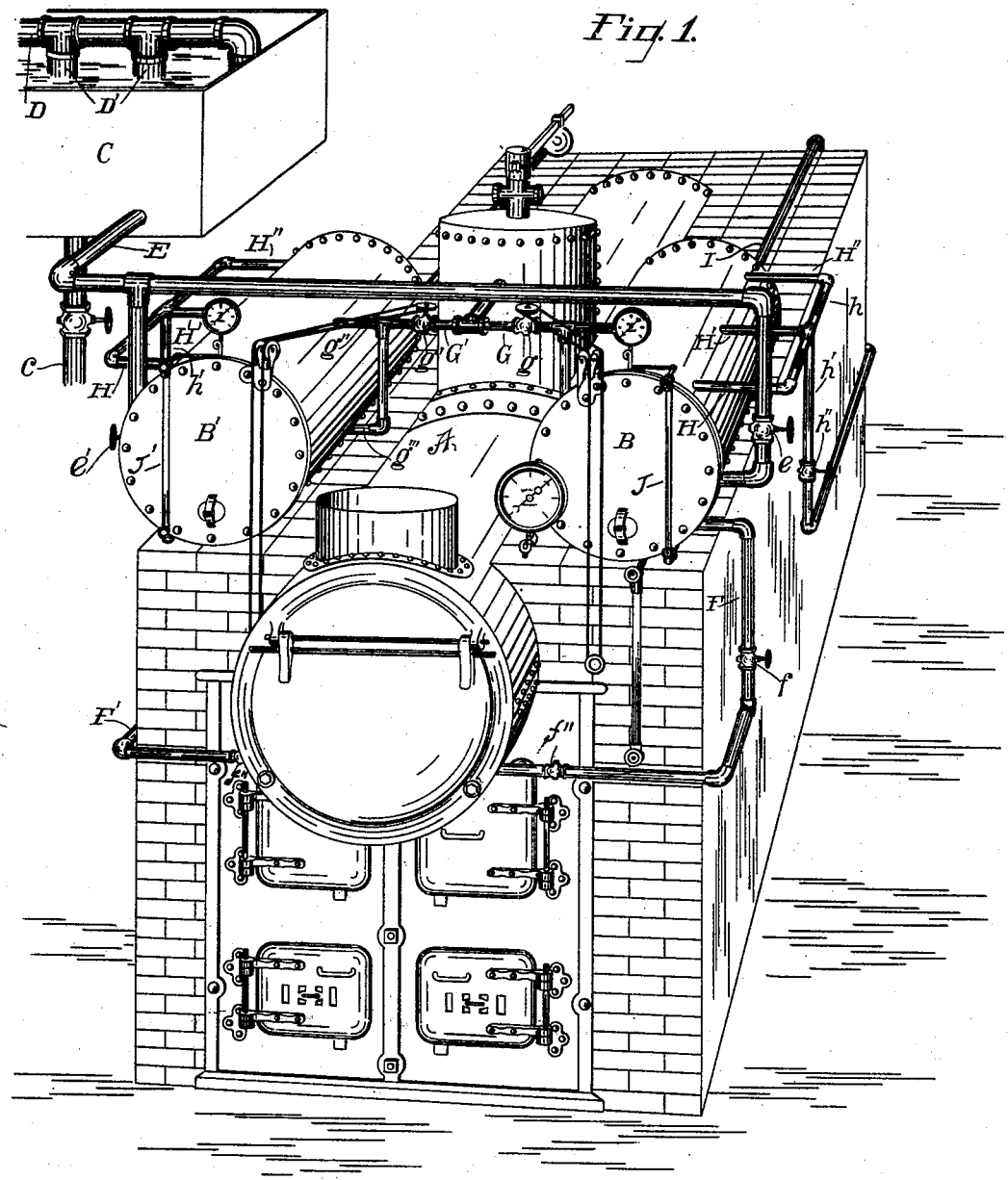

No. 637,223. Patented Nov. 21, 1899.
C. F. BAINTER.
APPARATUS FOR PURIFYING FEED WATER AND FEEDING BOILERS.
(Application filed July 20, 1896.)
(No Model.) 3 Sheets—Sheet 1.

Witnesses
Perry Kingman.
Alfred J. Townsend.

Inventor
Charles F. Bainter
by
Hazard & Townsend
his Attys.

No. 637,223. Patented Nov. 21, 1899.
C. F. BAINTER.
APPARATUS FOR PURIFYING FEED WATER AND FEEDING BOILERS.
(Application filed July 20, 1898.)
(No Model.) 3 Sheets—Sheet 2.
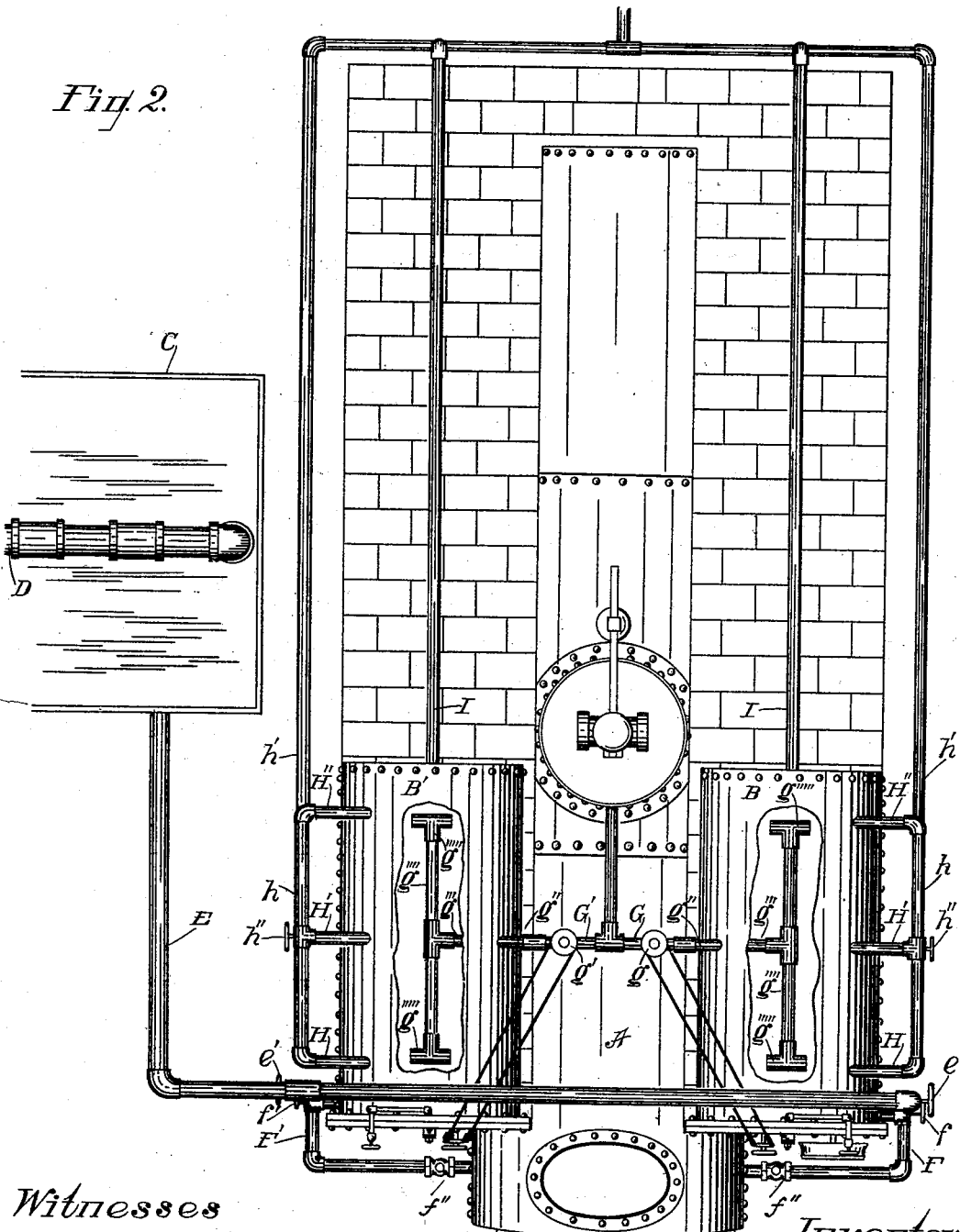

No. 637,223. Patented Nov. 21, 1899.
C. F. BAINTER.
APPARATUS FOR PURIFYING FEED WATER AND FEEDING BOILERS.
(Application filed July 20, 1896.)
(No Model.) 3 Sheets—Sheet 3.
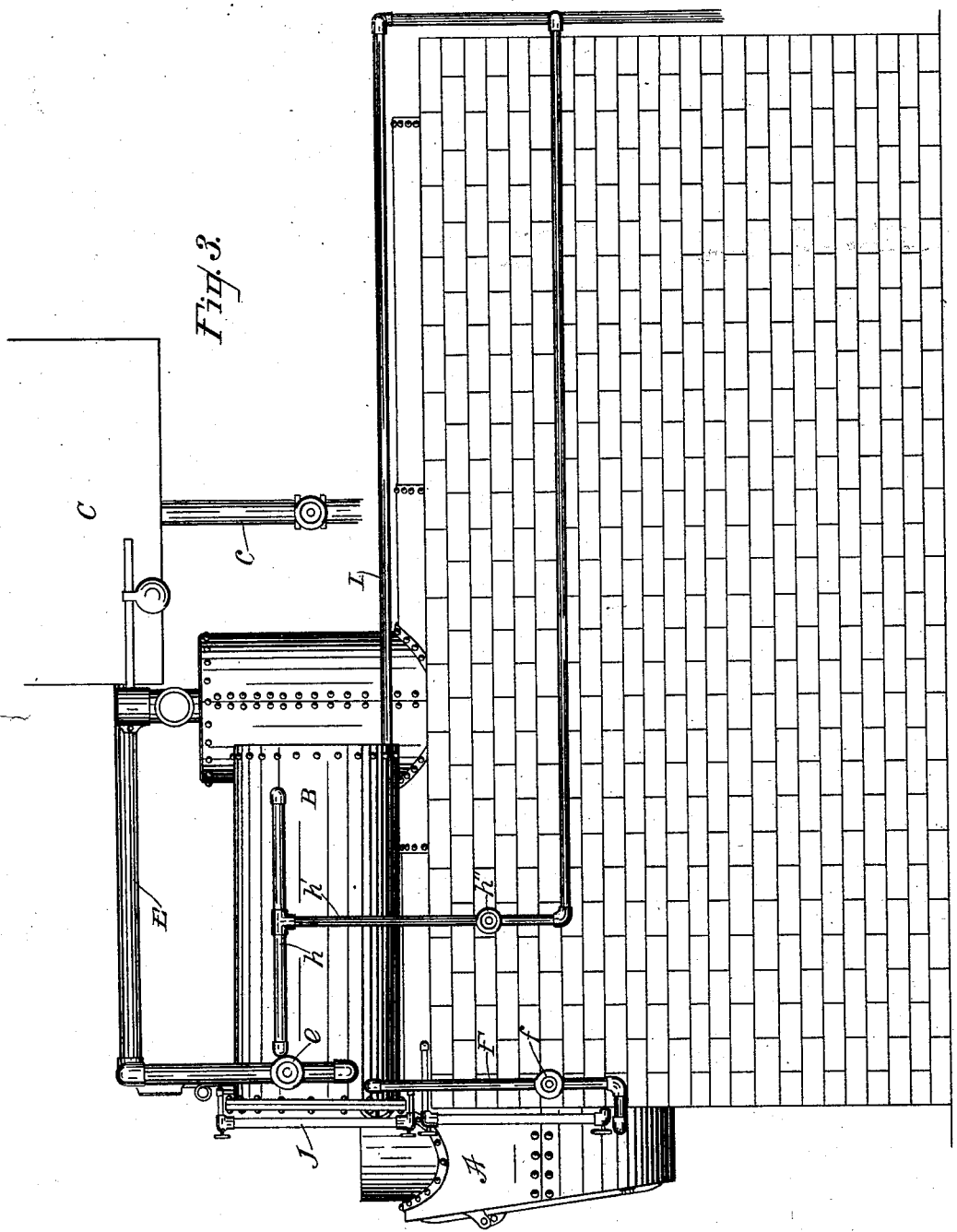

UNITED STATES PATENT OFFICE.

CHARLES F. BAINTER, OF LOS ANGELES, CALIFORNIA, ASSIGNOR, BY DIRECT AND MESNE ASSIGNMENTS, OF TWO-THIRDS TO GEORGE W. POSSELL AND CHARLES M. PERSONS, OF SAME PLACE.

APPARATUS FOR PURIFYING FEED-WATER AND FEEDING BOILERS.

SPECIFICATION forming part of Letters Patent No. 637,223, dated November 21, 1899.

Application filed July 20, 1896. Serial No. 599,837. (No model.)

*To all whom it may concern:*

Be it known that I, CHARLES F. BAINTER, a citizen of the United States, residing at Los Angeles, in the county of Los Angeles and State of California, have invented a certain new and useful Apparatus for Heating and Purifying Water and Feeding the Same to Boilers, of which the following is a specification.
The main objects of my invention are to supply for steam or other purposes pure water which will not produce scale or corrosion, to heat the water with which boilers are supplied economically by steam, to supply boilers with water heated to the temperature of that contained in the boilers, to automatically prevent the feed-water from entering the boilers at a lower temperature, thereby avoiding danger and injury from sudden change of temperature, to utilize the exhaust-steam from engines for partially heating and purifying the feed-water of boilers, to save a large amount of the water which in common practice is lost in exhaust-steam, and generally to simplify and improve the construction and operation of apparatus to which my invention relates.

The invention consists in means for separating and removing impurities in water first by exhalation and then by precipitation.

It consists, further, in means for heating water by subjecting it within a closed receptacle to the action of steam introduced into the receptacle both above and below the surface of the water.

It consists also in means of purifying water by subjecting it to the action of steam in a closed receptacle, as aforesaid, until it is raised to a temperature at which the impurities contained therein will be coagulated or separated and maintaining it at such temperature in a quiescent state until such impurities settle.

It consists also in means of heating and purifying water by subjecting the impure water in an open vessel to the action of steam introduced below the surface thereof, whereby the water is heated to a boiling temperature and deleterious gases, such as carbonic-acid gas, are expelled, and then heating the water to and maintaining it at a higher temperature in a closed vessel until the solid impurities are separated and precipitated.

It consists also in certain novel features in the construction and arrangement of parts of apparatus for carrying into effect the foregoing operations, as hereinafter particularly described, and pointed out in the claims.

In the accompanying drawings like letters designate the same parts in the several figures.

Figure 1 is a perspective view of apparatus embodying my invention. Fig. 2 is a plan view of the same, and Fig. 3 is a side elevation thereof.

In the drawings, A designates a boiler, and B B' closed receptacles arranged above the water-level of the boiler.

C is an open tank for holding the water with which the closed receptacles are to be supplied. Into this tank leads an exhaust-steam pipe D, which, in order to enlarge its area, and thus avoid back pressure, is provided with a number of large discharge-pipes D', extending downwardly into said tank from a horizontal arm or section of said exhaust-pipe and arranged to discharge the steam at a considerable distance below the surface of the water contained in said tank, whereby the exhaust-steam is condensed and the water is heated to a boiling temperature before it is introduced into said closed receptacles. This causes the liberation of carbonic-acid gas or other corroding gases contained in the impure water, and the agitating action of the exhaust-steam as it enters and passes through the water expels the liberated gases therefrom. By so providing the exhaust-pipe with a number of downwardly-extending discharge-pipes, of which three are shown in the drawings, the back pressure in said exhaust-pipe is reduced to a minimum, owing to the enlarged space allowed for expansion and to rapid condensation, which will take place on account of the enlarged area of water which is thus exposed to the steam. The discharge-openings through which the steam passes from the pipes D' into the tank below the surface of the water therein will be arranged in opposition to each other, so as to balance the force or impact of the steam as it enters the water in the tank and prevent hammering and shaking and straining of the apparatus. This opposing arrangement of the discharge-openings may be conveniently effected by providing the lower ends of the pipes D' with open-ended T's similar to the open-ended T's g''''' of the closed receptacles B B', and in view of which illustration they do not need to be separately illustrated for the open tank C. The capacity of the tank above the steam-discharge openings into the same should be sufficient to charge one of the closed receptacles, so that said openings will at all times be submerged.

A supply-pipe E connects the lower part of the tank C with each of the receptacles B B', preferably at the front end thereof. This pipe is provided with suitable valves e e', which control the supply of water to said receptacles. Feed-pipes F F', provided with valves f f', lead from the lower parts of said receptacles into the boiler.

f'' f''' are check-valves which allow water to flow through said pipes into the boiler, but prevent its flowing back therefrom into said receptacles. Steam-pipes G G' connect the steam-space of the boiler with the closed receptacles B B'. These pipes are provided with suitable valves g g', and each pipe is branched above the water-level of the receptacle with which it is connected and communicates with said receptacle through two branches g'' g''', one of which, g'', opens into said receptacle, above the water-level therein, and the other of which, g''', enters said receptacle, near the bottom thereof. The lower branch g''' is provided inside of said receptacle with discharge-limbs g'''', arranged to conduct the steam toward the ends of said receptacle, as shown in Fig. 2, each limb terminating in an open-ended T g''''' or opposing discharge-openings for distributing the heat and balancing the force or impact of the steam and preventing shaking and jarring the apparatus. This arrangement is employed in all submerged steam-discharge openings in my apparatus to avoid hammering and shaking and racking of the apparatus, which would otherwise occur.

To separate and remove scum and surface impurities from the water heated in the closed receptacles B B', a number of service drain and vent pipes H H' H'' are provided for each receptacle, each pipe having its mouth arranged at the high-water level in said receptacle and extending horizontally outward a short distance, where the several pipes are connected by a transverse pipe h, from which leads a downwardly-projecting pipe h', provided with a valve h'' below said receptacle. Blow-off pipes I I lead from the bottoms of the rear ends of the closed receptacles B B', and a blow-off pipe c leads out of the bottom of the open tank C. Through these blow-off pipes the sediment is removed from said receptacles and tank from time to time.

J J' designate water-gages for observing the water-level in the receptacles B B'.

For convenience in explaining the operation of the hereinbefore-described apparatus it will be assumed that a plant is arranged as shown in the drawings, such plant comprising a boiler, two closed feed-water receptacles, each adapted to contain, say, an hour's supply of water for the boiler, and an exhaust-steam-heated open supply-tank containing above its steam-inlets sufficient water for charging one of said receptacles. Referring to Fig. 1, the valve e is opened to admit water from the tank C into the receptacle B. The valve h'', controlling the surface drain and vent pipes leading from such receptacle, is opened to allow the water to run into said receptacle freely. When the water in the receptacle reaches the high-water mark, which intersects the mouths of the drain and vent pipes H H' H'', the valves e and h'' are closed, thus hermetically closing the receptacle B and leaving a space therein above the water to allow for the expansion and condensation of steam while the water is being heated. The valve g is then opened to admit steam through the pipe G and its branches g'' g''' from the steam-space of the boiler into said receptacle. The live steam flowing into said receptacle through the branch pipe g'' expands in the space above the water in said receptacle and coming in contact with the large area of water in the top of the receptacle condenses, so that the pressure in said receptacle above the water remains for a time considerably below that in the boiler. There being comparatively little or no expansion of the steam in the branch pipe g''' and a comparatively small heat-absorbing water-surface exposed to the steam in said pipe, the pressure of the steam on the water in said branch pipe g''' is greater at the outset than that on the surface of the water in said receptacle. This difference of pressure causes the live steam in the pipe g''' to force the water out of such pipe into the receptacle, thereby allowing the steam to enter the water at the open ends of the T's g''''' and to heat such water. The water thus heated is displaced by the cooler surrounding water, rises toward the top of the receptacle, and there mingles with the water which is being heated by the steam entering at the top of the receptacle. The action of the steam thus produces a circulation in the receptacle and the water at the top becomes rapidly heated to a high temperature; but the condensation of the steam above the water continues, so that the pressure in said receptacle remains below the pressure in the boiler, as indicated by the gage thereon. As the water becomes hotter its circulation gradually diminishes until its temperature is raised to that of the boiler. Then and not until then the gage on said receptacle will indicate the same pressure as the gage on the boiler, the flow of steam through the branch pipe $g'''$ will stop, and the water will instantly rise therein to the level of the water in said receptacle. In practice I find that in order to avoid drawing too heavily on the boiler about fifteen minutes should be allowed for heating a receptacle which will contain sufficient water to supply such boiler for one hour. After the water in the receptacle reaches the temperature of the water in the boiler it is allowed to stand perfectly quiet under boiler-pressure, thus permitting the impurities which have become coagulated and formed into precipitates by the action of the heat to settle to the bottom of the receptacle. Ordinarily about thirty minutes should be allowed after the water has become heated to the boiler temperature before it is drawn from the receptacle into the boiler. While the water is being heated in the receptacle a constant but slow circulation takes place through the surface vent and drain pipes H H' H'' and the transverse pipe $h$ by reason of the exposure of said pipes to the air and the slight difference in temperature which is thus produced between the water in the receptacle and the water in said pipes, whereby the scum and surface impurities are drawn from said receptacle into said pipes and are caused to settle and remain therein. The temperature ordinarily required to coagulate or separate solid impurities from the water, as above explained, is about 320° Fahrenheit or over, but under certain conditions may be less—that is to say, steam-pressure of about eighty pounds or over is ordinarily employed, but with some kinds of water a lower pressure and temperature are sufficient. After the impurities have settled and the water has been thoroughly purified the valve $f$ is opened, thus allowing the water to flow from the receptacle into the boiler. The pressure in the boiler and the pressure in the receptacle being equal, the greater elevation of the receptacle causes the water to flow therefrom into the boiler without the use of pumps or injectors. When communication between the steam-space of the boiler and the top and bottom of the receptacle through pipes $g''$ $g'''$ is open, the pressure within the receptacle cannot rise to that in the boiler until the water in the receptacle is heated to the temperature of that in the boiler. In the practical operation of the apparatus the boiler-pressure against the check-valve in feed-pipe F is sufficient to prevent the water from flowing from the receptacle into the boiler until the temperature of the water in the receptacle is nearly or quite equal to that of the water in the boiler. It follows, therefore, that the apparatus as hereinbefore described automatically prevents the feeding of cold water into the boiler, but automatically causes the water whenever it is sufficiently heated and the valves are opened for that purpose to flow into the boiler. The valve $f$ serves to prevent the water from passing into the boiler from the closed receptacle until the precipitation of impurities has ceased; but for the reason above explained said valve is not required to prevent the feeding of the water before it is sufficiently heated. The receptacle B' having in the meantime been filled with water from the tank C, steam is admitted thereto from the boiler to heat and purify the water therein in the manner explained in connection with receptacle B. After the water has been fed from the receptacle B through the feed-pipe F the valves $f$ and $g$ are closed, thus cutting off said receptacle from communication with the boiler. The valve $e$ is then opened and the steam in the receptacle B escapes through the pipe E and is discharged therefrom into the water in the tank C, where it is condensed and serves to heat the water therein. The flow of steam from the receptacle continues until the pressure of the water in tank C is greater than the steam-pressure in said receptacle, whereupon the water flows from said tank into said receptacle. The valve $h''$ of the surface blow-off pipe is then opened for a vent to allow the water to flow freely into said receptacle and to carry off the impurities previously deposited in the blow-off pipes. When the water reaches the high-water mark in said receptacle, the valves $e$ and $h''$ are closed, live steam is turned into said receptacle, as before described, and the tank C is again filled. When one receptacle is emptied, the purified water is drawn from the other receptacle into the boiler, the two receptacles being alternately emptied, filled, and heated, so that a constant supply of pure water is insured.

The pipes F F' open from the closed purifying-receptacles at points above the bottoms thereof, so as to avoid drawing the sediment and impurities therefrom into the boiler. The front end of each receptacle is preferably elevated slightly above the rear end, and the inlet-pipe E is preferably arranged to discharge the water from tank C into the front end of said receptacle. The blow-off pipe I, leading from the bottom of the rear and lower end of each receptacle, carries off the sediment deposited therein when the valve (not shown) in said pipe is opened without material loss of water, steam, or heat, the cleaning of the receptacle taking place after the purified water has been drawn therefrom.

For the purpose of continuously supplying purified water to a boiler a plurality of closed heating and purifying receptacles is provided and the parts of the apparatus are so connected that a minimum number of valves serves for its proper control and operation. While for the purpose above indicated it is preferable to provide two or more closed heating and purifying receptacles, a single receptacle may be employed to advantage for heating or purifying water for other purposes independently of the means described for feeding it into a steam-boiler, and parts of the apparatus as herein described for feeding water to a steam-boiler may also be employed to advantage under certain conditions without other parts required for the complete purification of the water.

I have found in practice that the application of my invention to boilers badly coated with scale will in a few months dissolve and loosen the scale, so that it can be easily removed. Applied to new boilers the invention prevents corrosion and the formation of scale, so that after long-continued use the insides of the boilers will appear as clean and smooth as when they were made.

The supply-pipes leading from the open heating-tank into the closed receptacles should be large enough to allow the receptacles to fill quickly—say within five minutes—so as to give ample time for the heating of the water and the precipitation of the impurities therein. The feed-pipes should also be large enough to allow the water to flow freely from said receptacles into the boiler. The water in the open tank C when heated by the exhaust-steam from an engine will be brought to a boiling temperature in about thirty minutes. Up to that time all of the exhaust-steam will be condensed in the tank, but after the water reaches the boiling-point there will be loss by evaporation. While the engine is running, the exhaust-steam pressure agitates the water in the open tank and rapidly expels carbonic-acid gas and other deleterious gases from the water contained therein.

The tank C should be kept nearly full of water, as shown in the drawings, throughout the heating process, so that when either of the closed receptacles is ready to be refilled the water in the tank will have been at a boiling temperature for a considerable time—say thirty minutes—sufficient to allow the deleterious gases which it contains to be completely expelled therefrom.

The closed receptacles B B' being alternately filled and emptied and heated and cooled and the sediment being removed therefrom at frequent intervals through the bottom blow-off pipes I, impurities are not allowed to attach to and form scale upon the walls of said receptacles, and it follows that no provision for access to the interior of said receptacles for the purpose of cleaning them is necessary.

The apparatus as hereinbefore described affords a reserve storage system under certain conditions for absorbing and saving the heat contained in the live steam which is blown off and would otherwise be wasted when the demand on the boiler is light and utilizing that heat when the demand on the boiler is heavy and its full capacity is needed.

Now, having described my invention, what I claim as new, and desire to secure by Letters Patent, is—

1. The combination of a boiler, a closed receptacle arranged above the water-level of the boiler and provided with a bottom blow-off, a valved feed-pipe leading from near the bottom of the receptacle into the boiler, a valved pipe for supplying water to the receptacle, a valved vent opening from the upper part of the receptacle, a valve-controlled steam-pipe connected with the steam-space of the boiler and opening into the lower part of the receptacle, and a valve-controlled steam-pipe connected with the steam-space of the boiler and opening into the receptacle above the water-level thereof, said steam-pipes being arranged to admit live steam from the boiler into said closed receptacle both above and below the water-level therein to act on the water at the same time, and the parts operating to admit water from the receptacle to the boiler when both bodies of water are at the same temperature, or substantially so, without the use of pumps or injectors, substantially as and for the purposes set forth.

2. The combination of a steam-boiler, a plurality of closed receptacles arranged above the water-level of the boiler and each provided with a bottom blow-off, a source of water-supply, valved pipes leading from said source of supply into the receptacles, valved vents opening from the upper part of the receptacles, valved pipes leading into the boiler from the lower parts of said receptacles, valve-controlled pipes connected with the steam-space of the boiler, and opening into the lower parts of said receptacles, and valve-controlled pipes connected with the steam-space of the boiler and opening into said receptacles above the water-level thereof, said pipes leading from the steam-space of the boiler into the closed receptacles being arranged to admit the live steam both above and below the water-level in the receptacles to act on the water at the same time, and the parts operating to admit water from the closed receptacles into the boiler when the water in the receptacles and that in the boiler are at the same temperature, or substantially so, without the use of pumps or injectors, substantially as and for the purposes set forth.

3. The combination of a boiler, a closed receptacle arranged above the water-level of the boiler and provided with a bottom blow-off, a valved feed-pipe leading from near the bottom of the receptacle into the boiler, a valved pipe for supplying water to the receptacle, a valved vent opening from the upper part of the receptacle, a steam-pipe connected with the steam-space of the boiler and extending above the water-level of said receptacle and there branched, and one of the branches opening into the receptacle above the water-level thereof and the other branch opening into the receptacle at a distance below the water-level, and a valve in said steam-pipe between the junction of its branches and the boiler, said branched steam-pipe admitting live steam into the closed receptacle both above and below the water-level therein to act on the water at the same time, and the parts operating to admit water from the receptacle to the boiler when the water in the receptacle and that in the boiler are at the same temperature, or substantially so, without the use of pumps or injectors, substantially as and for the purposes set forth.

4. The combination of a boiler, a closed receptacle provided with a bottom blow-off, a steam-pipe connected with the steam-space of the boiler and extending above the water-level of said receptacle and there branched, one of the branches opening into the receptacle above the water-level thereof and the other branch opening into the receptacle at a distance below the water-level, said branches operating to admit live steam into the closed receptacle both above and below the water-level to act on the water at the same time, and a valve in said steam-pipe between the junction of its branches and the boiler, whereby the water is heated by the live steam from both above and below the water-level and the period for heating and purifying is reduced, substantially as and for the purposes set forth.

5. The combination of a boiler, an open heating-tank, an exhaust-steam pipe having an enlargement extending downwardly and opening into said tank below the water-level therein, a closed receptacle below said tank and above the water-level of the boiler provided with a bottom blow-off, a supply-pipe leading from said tank into said receptacle, a valved feed-pipe leading from near the bottom of said receptacle into the boiler, a valved vent opening from the upper part of said receptacle, a valve-controlled steam-pipe connected with the steam-space of the boiler and opening into the lower part of said receptacle, and a valve-controlled steam-pipe connected with the steam-space of the boiler and opening into said receptacle above the water-level thereof, said steam-pipes admitting live steam both above and below the water-level in the closed receptacle to act on the water at the same time, and the parts operating to admit water from the closed receptacle into the boiler when the water in the receptacle and that in the boiler are at the same temperature, or substantially so, without the use of pumps or injectors, substantially as and for the purposes set forth.

6. A water heater and purifier comprising a steam-boiler, a closed water-containing receptacle, a steam-pipe leading from the steam-space of the boiler and branched above the water-line of said receptacle, one of the branches opening into said receptacle above the water-line and the other branch extending downward and opening into said receptacle below the water-line, said branches serving to admit live steam both above and below the water-level to act on the water at the same time, and a valve in said pipe between its branches and the boiler, whereby the water is heated by the live steam from both above and below the water-level and the period for heating and purifying is reduced, substantially as and for the purposes set forth.

7. A water heater and purifier comprising a steam-boiler, a closed water-containing receptacle, two live-steam pipes entering said receptacle, one above and the other below the water-line thereof, said pipes communicating directly with the steam-space of the boiler, whereby live steam is introduced into said receptacle above and below the surface of the water contained therein, and utilized for heating the water from above and below the water-level at the same time, whereby the period for heating and purifying the water is reduced, substantially as and for the purposes set forth.

8. A feed-water purifier, comprising a feed-water receptacle, a plurality of scum and surface drain pipes having open mouths arranged within the receptacle at high-water mark, said pipes leading from thence horizontally outward and connected with each other by a transverse pipe, and a pipe leading downward from said transverse pipe and provided with a valve at a distance below the mouths within the receptacle, whereby the pipes form settling-chambers for receiving and holding scum and surface impurities, substantially as and for the purposes set forth.

CHARLES F. BAINTER.

Witnesses:
ALFRED I. TOWNSEND,
JAMES R. TOWNSEND.